R. A. LACHMANN.
PULVERIZING MILL ROLLER AND SUPPORTING STRUCTURE.
APPLICATION FILED AUG. 15, 1918.
1,321,379.
Patented Nov. 11, 1919.
5 SHEETS—SHEET 2.
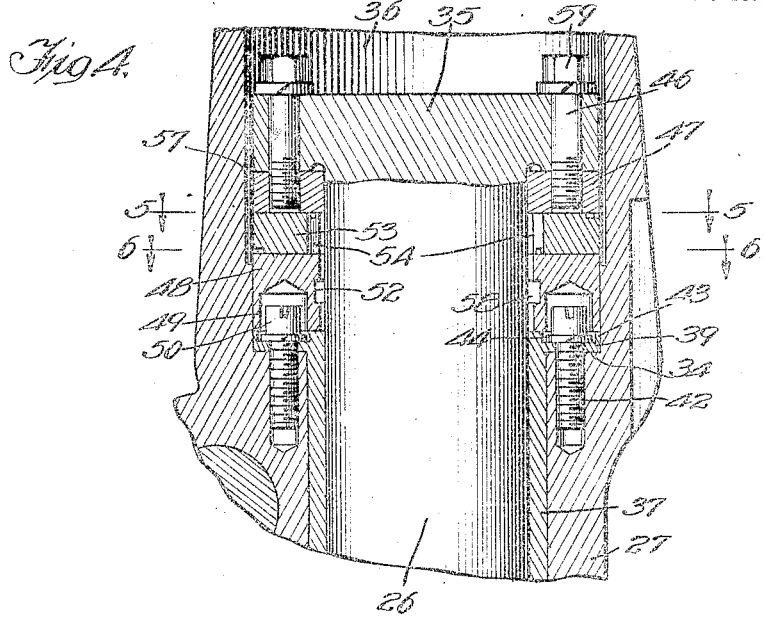
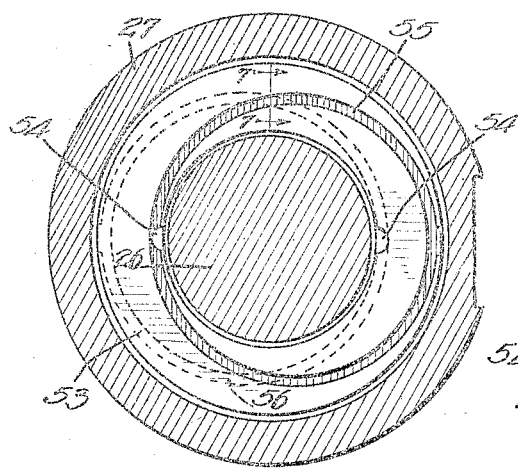
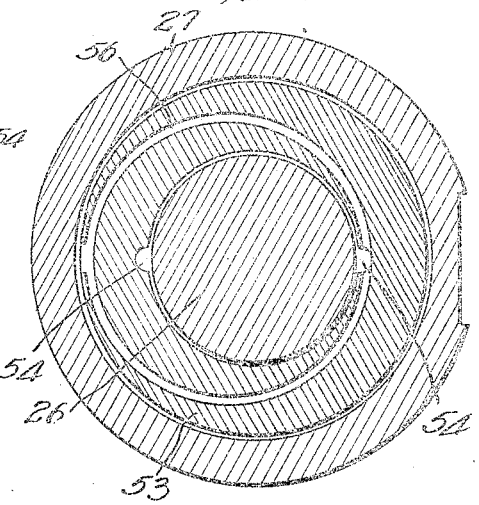
Witnesses:
W. Kilroy
Harry R. L. White
Inventor:
Robert A. Lachmann

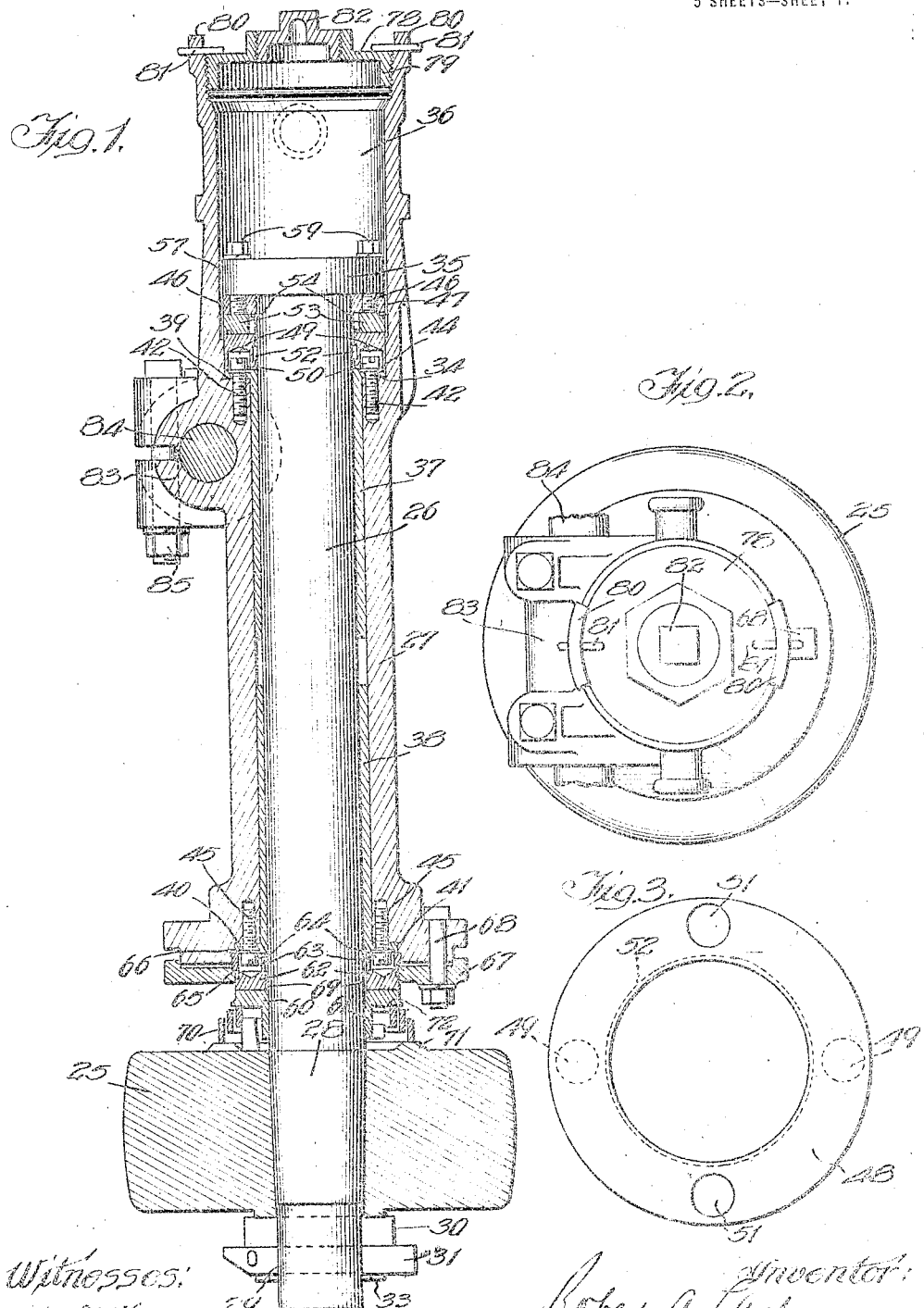

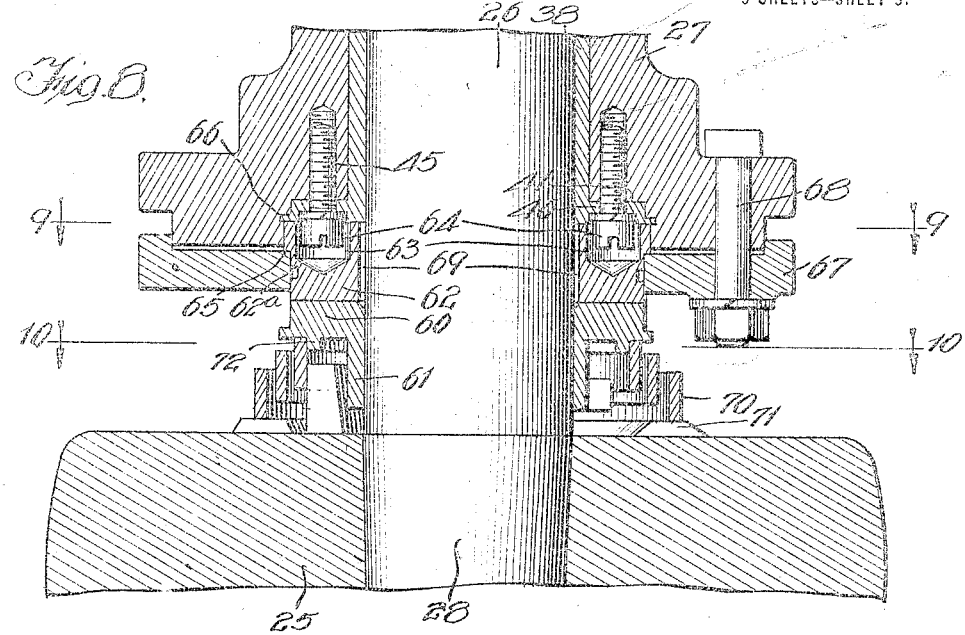
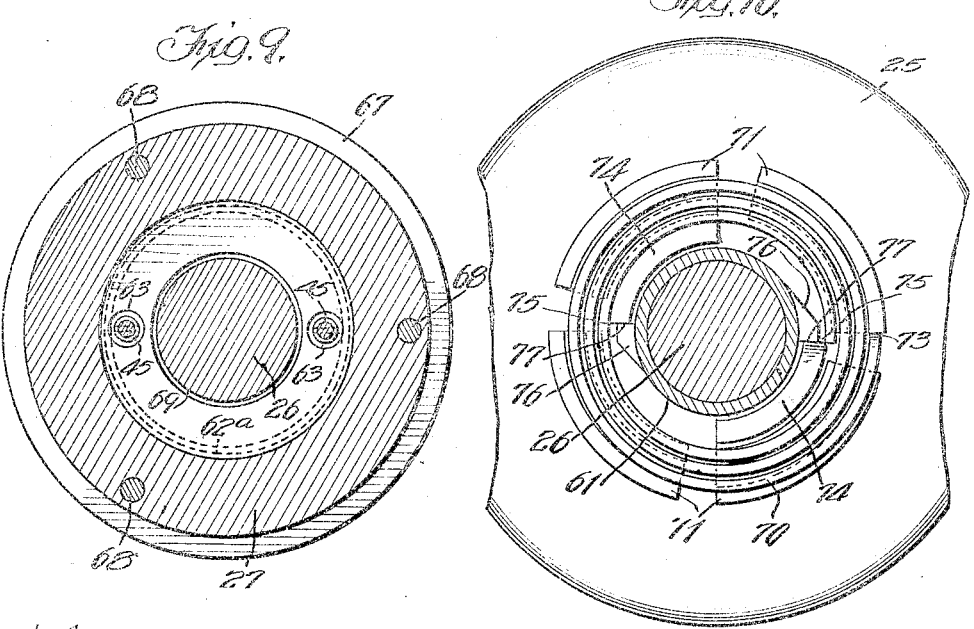

R. A. LACHMANN.
PULVERIZING MILL ROLLER AND SUPPORTING STRUCTURE.
APPLICATION FILED AUG. 15, 1918.
1,321,379.
Patented Nov. 11, 1919.
5 SHEETS—SHEET 4.
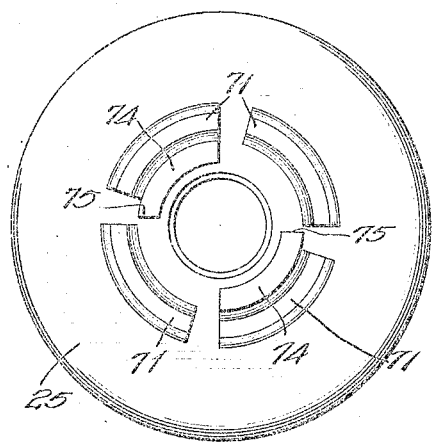
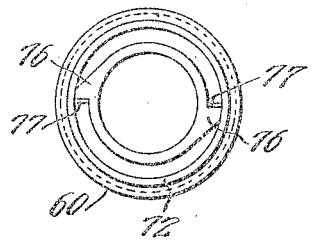
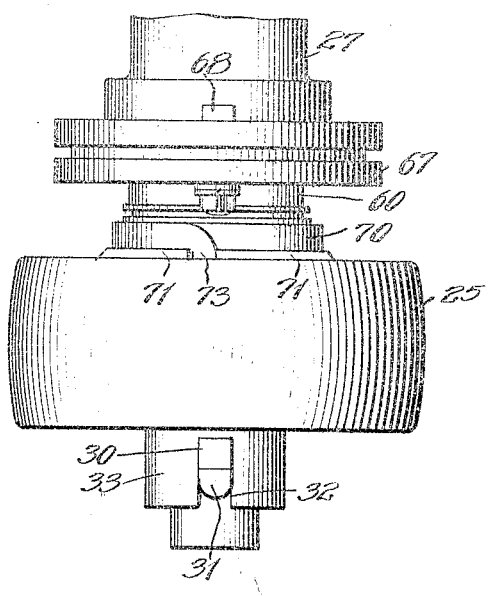
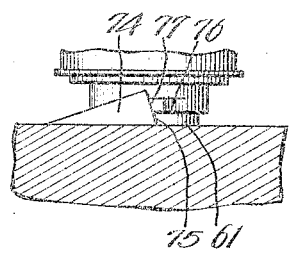

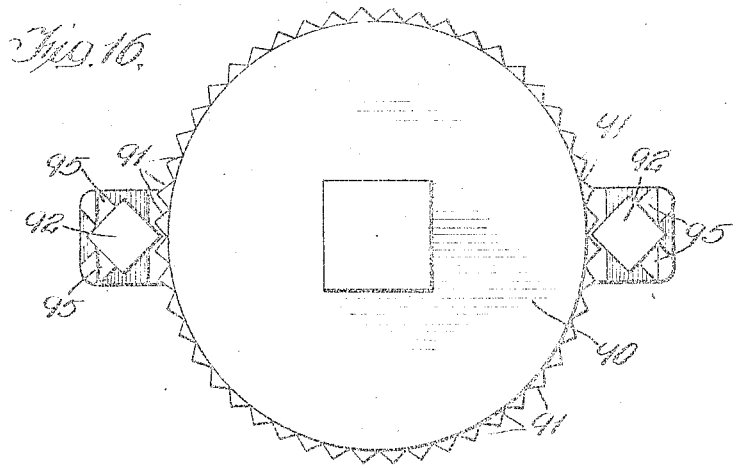
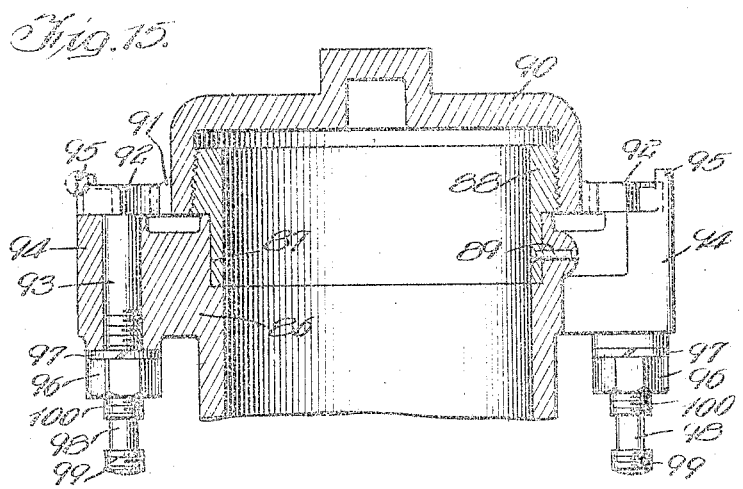
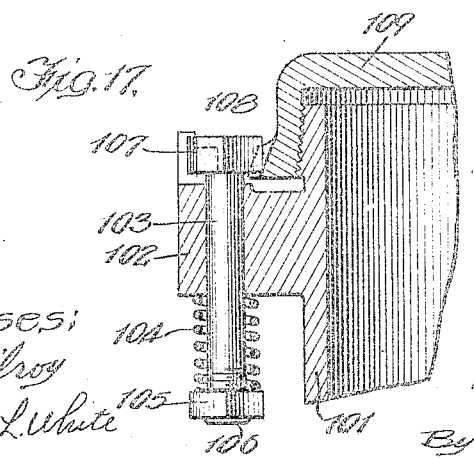

UNITED STATES PATENT OFFICE.

ROBERT A. LACHMANN, OF CHICAGO, ILLINOIS, ASSIGNOR TO RAYMOND BROTHERS IMPACT PULVERIZER COMPANY, OF CHICAGO, ILLINOIS, A CORPORATION OF ILLINOIS.

PULVERIZING-MILL ROLLER AND SUPPORTING STRUCTURE FOR SAME.

1,321,379. Specification of Letters Patent. Patented Nov. 11, 1919.

Application filed August 15, 1918. Serial No. 250,003.

*To all whom it may concern:*

Be it known that I, ROBERT A. LACHMANN, a citizen of the United States, residing at Chicago, in the county of Cook and State of Illinois, have invented certain new and useful Improvements in Pulverizing-Mill Rollers and Supporting Structures for Same, of which the following is a specification.

My invention relates to pulverizing apparatus, and more particularly to apparatus of the type in which the material operated on is crushed or pulverized between a "bull ring" or equivalent element, and rollers that rotate within the ring and are thrust against the same by centrifugal force. In a centrifugal impact pulverizing mill of this type each roller is ordinarily fixed to a shaft and this shaft or journal is carried in a housing pivoted to the centrally arranged driven shaft of the mill. The present invention has to do particularly with the construction of the roller shaft or journal and its housing and the parts associated therewith; and the object of the invention, generally speaking, is to provide certain improved arrangements in this part of the mill effecting economy and simplicity of construction, together with greater facility is assembling and dissassembling, and a more efficient and economical lubrication of the parts requiring lubrication than has been possible with the constructions heretofore employed. A special object of the invention is to provide sealing rings associated with the roller and the housing, together with means for keeping the same in contact, against the tendency to vibrate vertically, so as to prevent waste of lubricant.

The invention consists of the novel and improved arrangements, constructions and devices to be hereinafter described and claimed for carrying out the above stated objects and such other incidental objects as will appear from the following description of certain preferred embodiments of the invention. These embodiments are illustrated in the accompanying drawings, wherein:

Figure 1 is a longitudinal sectional view of a roller and its shaft and housing constructed in accordance with my invention;

Fig. 2 is a plan view of the top of the housing, on a larger scale than Fig. 1;

Fig. 3 is a detail plan view of one of the bearing rings intervening between the housing and head of the roller shaft;

Fig. 4 is a vertical sectional view illustrating the upper end of the roller shaft and parts associated therewith;

Figs. 5 and 6 are sectional plan views taken on lines 5—5 and 6—6, respectively, of Fig. 4;

Fig. 7 is a sectional view on line 7—7 of Fig. 5;

Fig. 8 is a vertical sectional view through the seal rings and associated parts at the lower end of the housing;

Figs. 9 and 10 are sectional plan views on lines 9—9 and 10—10, respectively, of Fig. 8;

Fig. 11 is a plan view of the top of the roller;

Fig. 12 is a view, in elevation, of the roller and associated parts at the lower end of the structure;

Fig. 13 is a detail sectional view illustrating the wedge engagement between the roller and the revolving seal ring;

Fig. 14 is a plan view of the bottom of this ring;

Fig. 15 is a fragmentary, vertical sectional view of the upper end of a modified form of housing;

Fig. 16 is a plan view of the same; and

Fig. 17 is a fragmentary vertical section illustrating another modified construction.

Like characters of reference designate like parts in the several figures of the drawings.

Referring first to Figs. 1 to 14 inclusive, 25 indicates the roller, 26 the shaft or journal of the roller, and 27 the housing for shaft 26. The roller is rigidly secured to the shaft in any desired manner. The drawings show the following common arrangement: The lower end of the shaft is tapered at 28 and formed with a slot 29 to receive a short key 30 and a longer key 31, these keys extending through slots 32 at opposite sides of a boss 33 which is formed integrally with the roller, the perforation through the roller being tapered to fit the tapered portion 28 of the shaft.

The housing 27 is formed with an internal shoulder 34 to support the head 35 of shaft 26. The portion of the housing above the head of the shaft forms a lubricant chamber 36 adapted to hold a supply of grease or other suitable lubricant.

Interposed between the shaft and the housing are bushings 37, 38, the upper bushing 37 having a flange 39 which overlaps the shoulder 34 of the housing, the lower bushing 38 having a flange 40 which fits into a recess 41 in the lower end of the housing. Screws 42 extend through the flange 39 of the upper bushing and into the housing, the flange 39 being preferably recessed at 43 for lock washers 44. Similar screws 45 hold the lower bushing 38 in place.

Interposed between the flange 39 of the upper bushing 37 and the head 35 of the roller shaft 26 are bearing rings in, preferably, the following arrangement: Secured to the under side of the head 35 by screws 46 is a ring 47 which is effectively a part of the shaft. Arranged on the flange 39 of bushing 37 is a ring 48 (Fig. 3) formed on its under side with a pair of diametrically arranged recesses 49 into which extend the heads 50 of screws 42. The ring is also provided, preferably, on its opposite face with a pair of similar recesses 51 arranged at right angles to the recesses 49 so that when the ring wears it may be reversed. For convenience in removing the ring from the housing its inner surface is formed with a groove 52. Between the rings 47 and 48 is arranged, preferably, a floating ring 53 having vertical lubricant grooves 54 on its inner surface and eccentric circular grooves 55, 56, on its upper and lower surfaces, respectively.

The internal diameter of the housing is increased, beginning at a point just below the top of ring 48, so that an annular space 57 is provided between the wall of the housing and the head 35 of the shaft and the ring 47 attached thereto. The internal diameter of ring 48 is preferably somewhat larger than the diameter of the shaft providing an annular lubricant duct 58. The external diameter of the floating ring 53 is preferably less than the internal diameter of the part of the housing in which the ring is arranged and the internal diameter of the ring is larger than the diameter of the shaft so that ring 53 will have certain capacity for shifting laterally as well as rotating. The heads 59 of screws 46 project into the grease chamber 36 and operate to break up the grease when the shaft is rotated. These preferred arrangements provide effective means for lubricating the bearing between the upper end of the roller shaft and the housing. The grease from grease chamber 36 will flow down through the annular duct 57 and will pass between the upper surface of ring 53 and the lower surface of ring 47 and between the lower surface of ring 53 and the upper surface of ring 48 into the lubricant groove 58 and thence down between the bushing and the shaft.

Associated with the roller 25 is a seal ring 60 formed with a hub 61 fitting the shaft 26. The upper surface of ring 60 is intended to bear against the under surface of seal ring 62 formed with recesses 63 on its upper surface into which project the heads 64 of the screws 45. The ring 62 is preferably formed with a shoulder 65 and is clamped against the housing, fitting into a recess 66 therein, by an annular member 67 secured to the housing by bolts 68. Ring 62 is also preferably formed with a groove 62$^a$ into which a chisel and screw driver may be inserted to facilitate removal of the ring from the housing when such removal becomes necessary. The internal diameter of ring 62 is preferably larger than the diameter of the shaft so as to leave a space 69 between the ring and the shaft to prevent the ring from cutting into the shaft in case the lower end of bushing 38 wears as it is bound to do because of the leverage of the roller against the bull ring. The ring 60 is held against ring 62 by a heavy flat coiled spring 70 which rests upon arcuate projections 71 formed on the upper surface of roller 25 and against the under side of ring 60, the latter being preferably formed with a rib 72 which the upper turn on the spring fits somewhat closely. Preferably one end of the spring is turned down, as indicated at 73 (Fig. 12) between t - of the arcuate projections 71 so that the spring is kept from rotating. Unless the spring were made so heavy as to be practically rigid, it is inevitable that with the operation of the mill there will be a tendency on the part of the rotating seal ring 60 to vibrate away from the ring 62 against which it is intended to bear. Such vibration, if it could take place, would result in the wasting of the lubricant through the gap between the rings.

In order to avoid this, I have devised an arrangement whereby the rotation of the roller produces an amount of friction between the roller and seal ring 60 sufficient to prevent vibration of the ring and hold it against the ring 62. The roller is formed with one or more, preferably two, lugs 74 having inclined faces 75 and the ring 60 is formed on its hub portion 61 with a pair of outwardly projecting lugs 76 having faces 77 adapted to bear against the faces 75 of the lugs on the roller and slanted in correspondence therewith. The inclination of the faces 75, 77, should be such that when the roller is revolved in its rotational movement around the bull ring, the resistance which this wedge engagement offers to downward movement of ring 60 will be great enough to keep ring 60 in contact with ring 62 without causing the rings to bend one on the other. The inclination of the wedge surfaces should be as near the angle of friction as possible.

The upper end of the housing is closed by a cover 78 having a threaded flange 79 adapted to screw into the housing. The housing is provided with lugs 80 and cotter pins 81 are driven through perforations in the lugs to hold the cover in place. The flange 79 of the cover and the threaded portion of the housing engaged thereby are preferably tapered as shown, and the upper surface of the cover is machined so that a close fit is obtained between the cover, housing and cotter pins. The cotter pins have a close fit in perforations of lugs 80. These arrangements are necessary inasmuch as the housing is subjected to constant and severe vibration when the mill is in operation. The cover is intended to be removed only in taking the structure apart. For filling the grease chamber the cover is provided with a threaded opening in which is screwed a plug 82.

The housing is formed with a split portion 83 at one side to receive the rock shaft 84 on which the structure is carried, the housing being clamped to shaft 84 by bolts 85 in the usual manner.

The structure above described has several advantages over the roller journal supporting structures heretofore employed in apparatus of the type indicated. The roller shaft is of uniform diameter, except for the head and the tapered portion which receives the roller, instead of being of different diameters at different places, as has been customary. The shaft is therefore stronger for a given weight of metal. The bushings 37, 38, between the housing and shaft are interchangeable. They may be removed independently and replaced or their positions reversed in case one wears to a greater extent than the other. The wear on the lower bushing is likely to be greater than on the upper one. A space exists between these bushings into which a bore may be inserted for removing the bushings when this becomes necessary. The bearings between the shaft and housing are efficiently lubricated without the waste of grease which has been one of the uneconomical features of former apparatuses. The shaft may be readily removed from the housing for the purpose of changing the roller, by removing the roller and the cover at the upper end of the housing. It is also an easy matter to renew the bearing rings when necessary. Any wear on the bearing rings is taken up by spring 70. At the same time the wedging arrangement between the roller and the ring 60 effectually prevents the vertical vibration of the seal ring which would be inevitable if spring pressure alone were relied upon to keep the seal ring against the ring on the housing. The shaft has a long bearing on the housing. The two sets of rings, viz., those at the upper and the lower ends of the housing, are a considerable distance apart so that even if the roller shaft gets out of alinement under stress of the roller against the bull ring and due to wear of the bushings, as is inevitable to a certain extent, there will be little tendency of the coengaging rings to gap or wear unevenly. The bushings when they wear on one side, as will naturally occur, may be given a half turn in the housing. Ring 47 may be reversed when worn.

Figs. 15 and 16 illustrate a modified form of cover construction for the upper end of the housing; that is to say, for the grease chamber. The upper end of the housing 86 is recessed at 87 for a renewable steel nose 88 which is secured to the housing by rivets 89. 90 is a cap internally threaded to screw on the externally threaded nose 88. The cap is formed at its lower edge with a series of teeth 91 adapted to be engaged by the corners of the heads 92 of a pair of screw bolts 93 slidably arranged in lugs 94 formed on opposite sides of the housing. The lugs 94 are provided on their upper surfaces with projections 95 adapted to bear against adjacent flat faces of the heads 92 of bolts 93. Each bolt is provided with a nut 96. Preferably lock washers 97 are interposed between the nuts and the under side lugs 94. The thread of each of the bolts 93 is cut away, as indicated at 98, and the threading of the portion 99 of the bolt below the cut away portion 98 is mutilated so that the nut can not be turned off the upper threaded portion 100. By unscrewing the nuts as far as they will go the bolts may be pushed up so that their heads 92 will clear the teeth 91 on the cap. The bolts may then be given a one-eighth turn and allowed to rest on lugs 95. In this position of the bolts the cap 90 may be screwed on and off.

In Fig. 17 a somewhat different arrangement is illustrated, one side only of the housing being shown. The housing, designated 101, is formed with a perforated lug 102 through which extends a bolt 103, a spiral spring 104 being interposed between the under side of the lug and a nut 105 on the bolt, the nut being held in place by upsetting the end of the bolt, as indicated at 106. The bolt has a head 107 at its upper end, one corner of which is adapted to engage with tapered or wedging teeth 108 formed on the cap 109. The bolt may be raised and its head disengaged from the teeth by compressing spring 104.

I claim:

1. In apparatus of the character described, the combination of a roller, a structure for revolubly supporting the same provided with a bearing surface, a ring, means for yieldingly forcing the same against said bearing surface, and means providing an engagement between said ring and roller whereby the revolution of the roller checks the tendency of the ring to vibrate axially.

2. In apparatus of the character described, the combination of a roller, a structure for revolubly supporting the same provided with a bearing surface, a ring having a wedging engagement with the roller, and means for yieldingly forcing the ring against said bearing surface.

3. In apparatus of the character described, the combination of a roller, a structure for revolubly supporting the same provided with a bearing surface, a ring having a wedge engagement with the roller, and a spiral spring interposed between said roller and ring which tends to force the latter against said bearing surface.

4. In apparatus of the character described, the combination of a roller, a shaft rigid with the roller, a housing for the shaft having a bearing surface at its lower end, a ring to bear against said surface, a spring between the roller and ring, and means providing an engagement between the ring and roller whereby the revolution of the roller and shaft checks the tendency of the ring to vibrate axially.

5. In apparatus of the character described, the combination of a roller, a shaft rigid with the roller, a housing for the shaft having a bearing surface at its lower end, a ring to bear against said surface having a wedging engagement with the roller, and a spring between the roller and the ring.

6. In apparatus of the character described, the combination of a roller, a shaft rigid with the roller, a housing for the shaft having a bearing surface at its lower end, a ring to bear against said surface having a wedging engagement with the roller, and a spiral spring between the roller and the ring.

7. In apparatus of the character described, the combination of a roller, a shaft rigid with the roller, a housing for the shaft having a bearing surface provided with a lubricant chamber above the shaft, a ring to bear against said surface having a wedging engagement with the roller, and a spring between the roller and ring.

8. In apparatus of the character described, the combination of a roller, a shaft rigid with the roller, a housing for the shaft, a bearing ring secured to the lower end of the housing, a ring to bear against said first named ring having a wedging engagement with the roller, and a spring interposed between the roller and said last mentioned ring.

9. In apparatus of the character described, the combination of a roller, a shaft rigid with the roller, a housing for the shaft, a bearing ring at the lower end of the housing having recesses in its upper surface, screws in said housing, the heads of which enter said recesses, an annular member adapted to engage said bearing ring and clamp the same against the housing, a ring having a wedging engagement with the roller, and a spring interposed between said last named ring and the roller.

10. In apparatus of the character described, the combination of a hollow housing formed with an internal shoulder near the top, a shaft with a head supported by said shoulder, a roller fixed to the lower end of the shaft, means providing a bearing surface at the lower end of the housing, a ring having wedging engagement with the roller, and a spring adapted to force said ring against said bearing surface.

11. In apparatus of the character described, the combination of a hollow housing formed with an internal shoulder near the top, a shaft with a head supported by said shoulder, a roller fixed to the lower end of the shaft, means providing a bearing surface at the lower end of the housing, a ring having wedging engagement with the roller, a spring adapted to force said ring against said bearing surface, and bushings extending into opposite ends of the housing between the same and said shaft.

12. In apparatus of the character described, the combination of a hollow housing formed with an internal shoulder near the top, a shaft with a head supported by said shoulder, a roller fixed to the lower end of the shaft, means providing a bearing surface at the lower end of the housing, a ring having wedging engagement with the roller, a spring adapted to force said ring against said bearing surface, and bearing rings interposed between said shoulder and the head of the shaft.

13. In apparatus of the character described, the combination of a hollow housing formed with an internal shoulder near the top, a shaft with a head supported by said shoulder, a roller fixed to the lower end of the shaft, means providing a bearing surface at the lower end of the housing, a ring having wedging engagement with the roller, a spring adapted to force said ring against said bearing surface, a bearing ring fixed to the under side of the head of the shaft, a ring supported on the shoulder of the housing and non-rotatable with respect thereto, and a floating ring between the last mentioned two rings.

14. In apparatus of the character described, the combination of a hollow housing formed with an internal shoulder near the top, a shaft with a head supported by said shoulder, a roller fixed to the lower end of the shaft, means providing a bearing surface at the lower end of the housing, a ring having wedging engagement with the roller, a spring adapted to force said ring against said bearing surface, a bearing ring fixed to the under side of the head of the shaft, a ring supported on the shoulder of the housing and non-rotatable with respect thereto, and a floating ring between the last mentioned two rings, said floating ring having eccentric lubricant grooves on its upper and lower surfaces.

15. In apparatus of the character described, the combination of a hollow housing formed with an internal shoulder near the top, a shaft with a head supported by said shoulder, a roller fixed to the lower end of the shaft, means providing a bearing surface at the lower end of the housing, a ring having wedging engagement with the roller, a spring adapted to force said ring against said bearing surface, a bearing ring fixed to the under side of the head of the shaft, a ring supported on the shoulder of the housing and non-rotatable with respect thereto, and a floating ring between the last mentioned two rings, the internal diameter of the floating ring being greater than the diameter of the shaft.

16. In apparatus of the character described, the combination of a hollow housing formed with an internal shoulder near the top, a shaft with a head supported by said shoulder, a roller fixed to the lower end of the shaft, means providing a bearing surface at the lower end of the housing, a ring having wedging engagement with the roller, a spring adapted to force said ring against said bearing surface, a bearing ring fixed to the under side of the head of the shaft, a ring supported on the shoulder of the housing and non-rotatable with respect thereto, and a floating ring between the last mentioned two rings, the internal diameter of the floating ring being greater than the diameter of the shaft, and its external diameter being less than the corresponding internal diameter of the housing.

17. In apparatus of the character described, the combination of a hollow housing formed with an internal shoulder near the top, a shaft with a head supported by said shoulder, a roller fixed to the lower end of the shaft, means providing a bearing surface at the lower end of the housing, a ring having wedging engagement with the roller, a spring adapted to force said ring against said bearing surface, a bearing ring fixed to the under side of the head of said shaft, said head and ring having a diameter less than the corresponding internal diameter of the housing, and a ring seated on the shoulder of the housing and non-rotatable with respect thereto, the internal diameter of which is greater than the corresponding diameter of said shaft.

18. In apparatus of the character described, the combination of a hollow housing formed with an internal shoulder near the top, a shaft with a head supported by said shoulder, a roller fixed to the lower end of the shaft, means providing a bearing surface at the lower end of the housing, a ring having wedging engagement with the roller, a spring adapted to force said ring against said bearing surface, a bearing ring fixed to the under side of the head of said shaft, said head and ring having a diameter less than the corresponding internal diameter of the housing, a ring seated on the shoulder of the housing and non-rotatable with respect thereto, the internal diameter of which is greater than the corresponding diameter of said shaft, and a floating ring between said last mentioned rings, the internal diameter of which is greater than the diameter of the shaft.

19. In apparatus of the character described, the combination of a housing having an internal shoulder at its upper end, a shaft with a head adapted to be supported by said shoulder, a roller on the lower end of the shaft, bushings which extend into the housing from opposite ends between the same and the shaft and provided with flanges, the flange on the upper bushing bearing against said shoulder and the flange on the lower bushing against the bottom of the housing, bearing rings interposed between the head and the flange of the upper bushing, a bearing ring secured against the flange of the lower bushing, a ring on the shaft having a wedging engagement with the roller, and a spring to force said ring against the ring on the lower end of the housing.

20. In apparatus of the character described, the combination of a housing, a shaft having a head supported in said housing with the lower end projecting therefrom, a roller on the lower end of the shaft, means on the lower end of the housing providing a bearing surface, a ring on the shaft between the lower end of the housing and roller, provided with a hub formed with a projecting lug having an inclined face, a lug on the roller having an inclined face corresponding to the face of the lug on the ring, and a spiral spring interposed between said ring and the roller.

21. In apparatus of the character described, the combination of a housing, a shaft having a head supported in said housing with the lower end projecting therefrom, a roller on the lower end of the shaft, means on the lower end of the housing providing a bearing surface, a ring on the shaft between the lower end of the housing and roller, provided with a hub formed with a projecting lug having an inclined face, a lug on the roller having an inclined face corresponding to the face of the lug on the ring, and a spiral spring interposed between said ring and the roller, the roller being formed with arcuate projections for said springs to rest upon and the end of the spring being bent down so as to engage one of said projections, for the purpose described.

22. In apparatus of the character described, the combination of a housing having an internal shoulder, a shaft having a head adapted to be supported by said shoulder, a roller on the lower end of the shaft, screws which project from said shoulder, and a ring arranged between the shoulder and head of the shaft having recesses on opposite faces for said screws so that the position of the ring may be reversed.

23. In apparatus of the character described, the combination of a housing having an internal shoulder, a cover which closes the upper end of the housing having a filling opening and a plug to close the same, a shaft having a head adapted to be supported by said shoulder on the housing, bearing rings interposed between said head and shoulder, a bearing ring and means for securing it to the lower end of the housing, a roller on the lower end of the shaft, a ring on the shaft between the roller and the housing having a wedging engagement with the roller, and a spring interposed between said last named ring and the roller.

24. In apparatus of the class described, the combination of a roller, a shaft rigid with the roller, a housing for the shaft, a bearing ring at the lower end of the housing, means to secure the ring to the housing, a ring to bear against said first named ring having a wedging engagement with the roller and a spring interposed between the roller and said last ring.

25. In apparatus of the character described, the combination of a hollow housing formed with an internal shoulder near the top, a shaft with a head supported by said shoulder, a roller fixed to the lower end of the shaft, means providing a bearing surface at the lower end of the housing, a ring having wedging engagement with the roller, a spring adapted to force said ring against said bearing surface, a bearing ring fixed to the under side of the head of the shaft, and a ring supported on the shoulder of the housing and non-rotatable with respect thereto.

ROBERT A. LACHMANN.